(12) United States Patent
Herbiet

(10) Patent No.: US 10,458,401 B2
(45) Date of Patent: Oct. 29, 2019

(54) HOUSING FOR A MOTOR OR COMPRESSOR

(71) Applicant: KNORR-BREMSE Systeme fuer Nutzfahrzeuge GmbH, Munich (DE)

(72) Inventor: Olivier Herbiet, La Chapellel Yvon (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 93 days.

(21) Appl. No.: 15/665,942

(22) Filed: Aug. 1, 2017

(65) Prior Publication Data

US 2017/0328356 A1 Nov. 16, 2017

Related U.S. Application Data

(63) Continuation of application No. PCT/EP2016/051739, filed on Jan. 28, 2016.

(30) Foreign Application Priority Data

Feb. 2, 2015 (DE) .......................... 10 2015 101 459

(51) Int. Cl.
*F04B 39/12* (2006.01)
*B22D 17/20* (2006.01)
(Continued)

(52) U.S. Cl.
CPC ............ *F04B 39/128* (2013.01); *B22D 17/20* (2013.01); *F02F 7/0048* (2013.01); *F03C 1/002* (2013.01);
(Continued)

(58) Field of Classification Search
CPC ..... F04B 39/121; F04B 39/128; F02F 7/0048; B22D 17/20
(Continued)

(56) References Cited

U.S. PATENT DOCUMENTS 6,125,811 A * 10/2000 Koriyama ............. F02F 7/0007
123/195 A
2010/0074779 A1 3/2010 Hebrard et al.

FOREIGN PATENT DOCUMENTS

AT 182576 B 7/1955
DE 195 32 326 C1 1/1997
(Continued)

OTHER PUBLICATIONS

Machine Translation of FR461594 (Year: 2018).*
(Continued)

*Primary Examiner* — Michael Leslie
*Assistant Examiner* — Daniel S Collins
(74) *Attorney, Agent, or Firm* — Crowell & Moring LLP

(57) ABSTRACT

A housing for a motor or compressor has an elongate crankcase with two end surfaces. At least one cylinder chamber is provided in which a piston is caused to perform a movement by rotation of the crankshaft. The internal diameter of the crankcase narrows monotonously from the first end surface to the second end surface. A crankcase shaped in this way can be manufactured particularly easily by virtue of the casting being performed around a shaping mandrel. A shaping mandrel of this type must likewise narrow monotonously in order that, after the casting has been performed around it, the shaping mandrel can be pulled out of the housing at a first end. By way of the shaping of the crankcase, it is possible for the housing to be of unipartite and at the same time very compact construction.

9 Claims, 5 Drawing Sheets

(51) Int. Cl.
*F03C 1/00* (2006.01)
*F02F 7/00* (2006.01)
*F04B 53/16* (2006.01)
*F16C 7/02* (2006.01)

(52) U.S. Cl.
CPC ............ *F04B 39/121* (2013.01); *F04B 53/16* (2013.01); *F16C 7/023* (2013.01); *F05C 2201/021* (2013.01); *F05C 2201/028* (2013.01); *F05C 2201/0412* (2013.01)

(58) Field of Classification Search
USPC .............................................................. 92/72
See application file for complete search history.

(56) References Cited

FOREIGN PATENT DOCUMENTS

| | | |
|---|---|---|
| DE | 698 22 764 T2 | 8/2004 |
| FR | 461 594 A | 1/1914 |
| FR | 1 191 087 A | 10/1959 |
| JP | 49-132308 U | 11/1974 |
| JP | 59-81785 U | 6/1984 |
| JP | 3-68576 U | 7/1991 |
| JP | 5-99068 A | 4/1993 |
| JP | 5-64484 U | 8/1993 |
| JP | 2003-214173 A | 7/2003 |
| JP | 2005-344727 A | 12/2005 |
| JP | 2006-183530 A | 7/2006 |
| JP | 2010-502881 | 1/2010 |

OTHER PUBLICATIONS

Machine Translation of FR1191087 (Year: 2018).*
International Preliminary Report on Patentability (PCT/IB/326, PCT/IB/338, and PCT/IB/373) issued in PCT Application No. PCT/EP2016/051739 dated Aug. 17, 2017, including English translation of document C2 (German-language Written Opinion (PCT/ISA/237)) previously filed on Aug. 1, 2017 (10 pages).
International Search Report (PCT/ISA/210) issued in PCT Application No. PCT/EP2016/051739 dated May 9, 2016 with English-language translation (four (4) pages).
Japanese-language Office Action issued in counterpart Japanese Application No. 2017-558774 dated Oct. 22, 2018 with English translation (nine (9) pages).

* cited by examiner

HOUSING FOR A MOTOR OR COMPRESSOR

CROSS REFERENCE TO RELATED APPLICATIONS

This application is a continuation of PCT International Application No. PCT/EP2016/051739, filed Jan. 28, 2016, which claims priority under 35 U.S.C. § 119 from German Patent Application No. 10 2015 101 459.9, filed Feb. 2, 2015, the entire disclosures of which are herein expressly incorporated by reference.

BACKGROUND AND SUMMARY OF THE INVENTION

The invention relates to a housing, which can be manufactured cost-effectively, for a motor or compressor, to a motor or compressor having said housing, and to a production method.

For the supply of compressed air to pneumatic brake systems of heavy goods vehicles and buses, use is generally made of compressors with one to two pistons. A crankshaft is set in rotation by means of a drive source. Connecting rods are rotatably mounted both on the crankshaft and on the pistons. The rotational movement of the crankshaft is converted by the connecting rods into an upward and downward movement of the pistons in their cylinders. The air is compressed by means of said upward and downward movement. The housings of such compressors are generally cast in one piece from cast iron in a sand mold or a permanent mold. As an alternative, it is known for grey cast-iron cylinders cast in one piece in a sand mold to be mounted onto a base housing composed of aluminum that has been produced by high-pressure casting.

In the case of compressors with two or more cylinders, the production of the large crank chamber in which the crankshaft moves during operation is very difficult using high-pressure casting methods. Therefore, that part of the housing which includes the crank chamber is commonly manufactured in two pieces. This necessitates a cumbersome assembly process after the casting, and creates connection points between the housing parts, which are in principle susceptible to leakage.

The problem addressed by the invention is therefore that of providing a housing for a motor or compressor, which housing is easier to manufacture in one piece, such that it is easier to assemble and is at the same time less susceptible to leakage than the housings manufactured from multiple pieces according to the prior art.

This problem is solved by a housing according to embodiments of the invention, as well as by a motor or compressor with said housing, and by a production method for the housing and motor.

In the context of the invention, a housing for a motor or compressor has been developed. The housing has an elongate crank chamber which has two end surfaces. "Elongate" is to be understood to mean that the crank chamber extends along an axis and has a greater extent along said axis than perpendicular to said axis. The crank chamber serves for accommodating a crankshaft.

Furthermore, at least one cylinder chamber is provided in which a piston is caused to perform a reciprocating movement by a rotation of the crankshaft.

The crank chamber has, in a first end surface, an opening through which the crankshaft can be inserted into said crank chamber. According to the invention, the inner diameter of the crank chamber narrows monotonously from the first end surface to the second end surface.

A monotonous narrowing is to be understood to mean that the inner diameter of the crank chamber only decreases or remains constant, but increases no further, on a path along the axis of said crank chamber from the first end surface to the second end surface.

It has been identified that a crank chamber shaped in this way can be manufactured particularly easily by casting the housing material around a shaping mandrel. A shaping mandrel of said type must narrow monotonously from its first end to its second end in order that it can be pulled at its first end out of the housing after the casting-around process. Crank chambers according to the previous prior art, which had the shape of a straight cylinder or had numerous undercuts, were not capable of being manufactured by means of this simple method. By means of the shaping of the crank chamber according to the invention, the housing can be of unipartite and, at the same time, very compact construction.

Here, the disadvantage was firstly accepted that, in the case of a motor or compressor with multiple cylinders, much less movement space is available in the crank chamber for at least one connecting rod of one cylinder, and thus in general the connecting rods must be of slimmer dimensions and/or the crankcase bulge close to the first end must be larger. It was identified that this disadvantage is overcompensated by the much simpler manufacture of the housing.

The crank chamber advantageously tapers in the shape of a cone or frustum from the first end surface to the second end surface. The shell of said cone or frustum is advantageously inclined with respect to its axis of symmetry by an angle of between 0.5 and 10 degrees, preferably 0.5 and 5 degrees, and very particularly preferably between 1 and 5 degrees. A shaping mandrel used for the production process can then be removed most easily after the casting-around process. The housing is advantageously cast in one piece. The housing is advantageously composed at least partially of aluminum, magnesium, titanium, of an aluminum, magnesium or titanium alloy, or of some other lightweight alloy suitable for pressure casting. The crankcase may also taper in the shape of a cone or frustum from each of the two end surfaces toward its interior, which can be manufactured for example by casting around two shaping mandrels which are subsequently pulled out in opposite directions. It is thus possible for the movement space available for the connecting rod in the vicinity of the second end surface to be enlarged. In the case of a two-cylinder compressor, it can thus be achieved, for example, that identically dimensioned connecting rods can be used for both cylinders.

The motor or compressor according to the invention has a housing according to the invention. At least two cylinder chambers for accommodating in each case one piston are provided in said housing. The pistons are driven by a crankshaft. For this purpose, one connecting rod is provided per cylinder chamber, which connecting rod is rotatably mounted by way of a first connecting-rod eye on the crankshaft and by way of a second connecting-rod eye on a piston which runs in the cylinder chamber. According to the invention, in a comparison of two connecting rods mounted along the axis of the crankshaft, the outer diameter of the connecting rod in the region of the first connecting-rod eye and/or the inner diameter of the first connecting-rod eye also narrows with the respective inner diameter of the crank chamber.

If the housing has two cylinders, for example, a first cylinder will be closer to the opening, through which the crankshaft can be inserted into the crank chamber, than the second cylinder. Then, at the location of the first connecting rod, where the inner diameter of the crank chamber is relatively large, more movement space is available for the movement of the first connecting-rod eye around the crankshaft. At the location of the second connecting rod, where the inner diameter of the crankcase is relatively small, there is accordingly less movement space available around the crankshaft for the movement of the first connecting-rod eye of the second connecting rod around the crankshaft. According to the invention, the second connecting rod is adapted to the situation.

It is self-evidently possible to use the relatively small connecting rod at both cylinders. However, with increasing thickness, a connecting rod is naturally also more stable. For the price of slightly increased outlay for the manufacture of two different parts, the power that can be transmitted by the connecting rods can thus be increased overall by using two connecting rods of different size. The exact dimensions of the connecting rods are determined on an application-specific basis by the force demands of the compressor or motor operation.

In general, the connecting rod which is closest to the drive of the compressor along the axis of the crankshaft is subjected to greater mechanical load. This also applies to the crankpin that connects the connecting rod to the crankshaft. The drive is therefore advantageously connected to that end of the crankshaft which passes through the first end surface. Then, the connecting rod which is closest to the drive has the greatest possible freedom of movement in the crank chamber and can be dimensioned to be correspondingly stronger.

In an advantageous refinement of the invention, the pistons have identical diameters and/or identical stroke travels. They particularly preferably have both identical diameters and identical stroke travels. Then, the air compression is performed uniformly; the narrowing of the crank chamber no longer has an effect on the air supply system connected downstream of the compressor. For this purpose, the compressor advantageously has only one pressure stage.

A flange is advantageously arranged on the first end surface of the crank chamber. The flange can adapt the housing to a wide variety of outputs, drives and other hardware in the engine bay of a vehicle, without the need to modify the casting mold for the housing. The crankshaft is particularly advantageously led through the flange for the purposes of connection to the output or drive.

Alternatively or in combination with this, the flange may also perform further functions. In a further advantageous refinement of the invention, the flange may be designed for the fastening of the motor or compressor in the engine bay of a vehicle. Alternatively or in combination, the flange may also be designed for the fastening of a further assembly, which is driven by means of the crankshaft, to the motor or compressor. The further assembly may, for example, be a steering assistance pump.

The cylinder chambers may be arranged entirely in the housing. The cylinder chambers may however also merely begin in the housing and continue into cylinders which are mounted as separate parts onto the housing. The cylinder barrels are wearing parts. When they have become worn, it is less expensive to merely replace a separately mounted cylinder than having to discard the housing entirely. Furthermore, weight can be saved in this way. For example, aluminum is particularly advantageous as a material for the housing because it is lightweight. By contrast, steel is more robust and is thus more suitable as a cylinder barrel. With a housing composed of aluminum and cylinders composed of steel, the specific advantages of both materials can be combined.

In the context of the invention, a method for producing a housing according to the invention has also been developed. The method is distinguished by the fact that the crank chamber is manufactured by casting the housing material around an elongate shaping mandrel which has two ends and the outer diameter of which narrows monotonously from its first end to its second end. Aluminum in particular is advantageous as a housing material.

It has been identified that the production of the crank chamber is particularly critical because it constitutes the largest cavity in the housing. By means of the shaping mandrel, stability is imparted to the cavity until the cast material has cooled and the cavity has become self-supporting. In this way, the production of a housing in one piece is dramatically simplified. After the casting-around process, the shaping mandrel is advantageously pulled at its first end out of the housing. In the case of methods other than pressure casting methods, it may however also be expedient for the shaping mandrel to be removed destructively, for example by virtue of the shaping mandrel being broken up or dissolved using a caustic agent.

The housing material should adhere as little as possible to the material of the shaping mandrel. The housing material is therefore advantageously composed of a different material than the housing material.

The shaping mandrel may in particular taper in the manner of a cone or frustum. The shell of said cone or frustum is advantageously inclined with respect to its axis of symmetry by an angle of between 5 and 30 degrees, preferably between 5 and 15 degrees.

If the shaping mandrel narrows more intensely, the crank chamber may possibly be too narrow at its second end for the movement of a connecting rod around the crankshaft. If the shaping mandrel narrows to a much lesser extent, it may be much more difficult to pull it out of the cooled housing material, and it may break when this is attempted.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
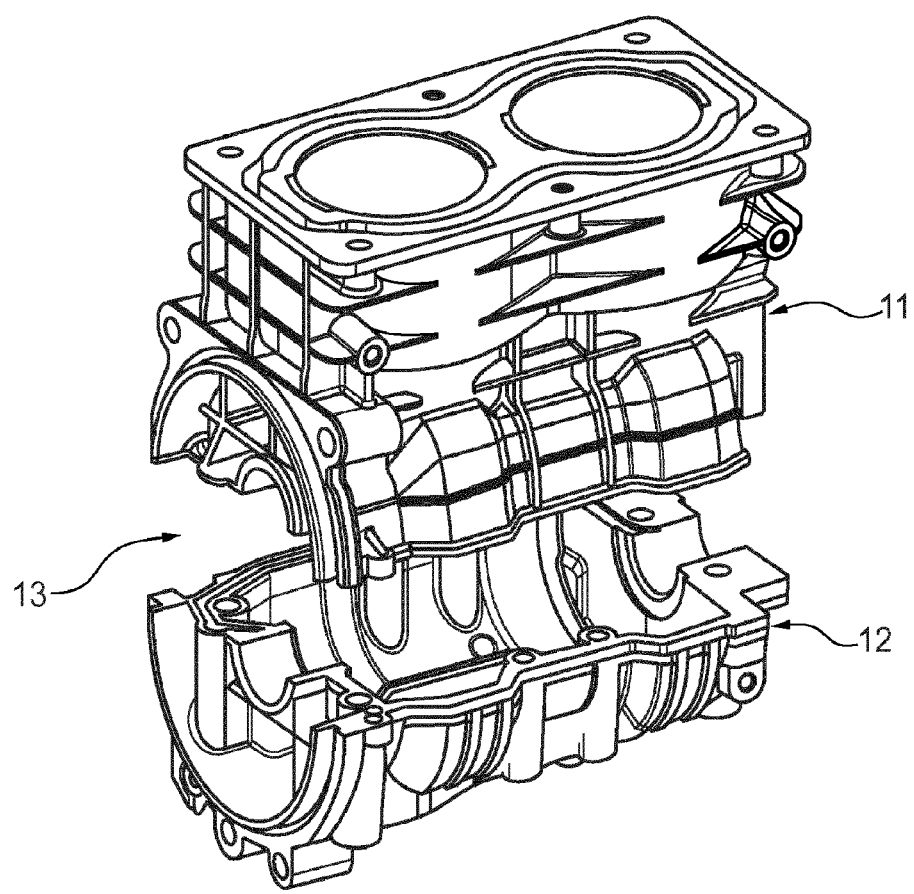
FIG. 1 shows a crankcase manufactured in two parts according to the prior art.

FIG. 1 shows a compressor housing manufactured in two parts according to the prior art. The compressor housing is composed of the housing parts 11 and 12. It is disadvantageous that, at its end 13 through which the crankshaft is inserted, a T-shaped seal is required in the connection to the drive source. This seal is susceptible to leakage.

Figure 2:
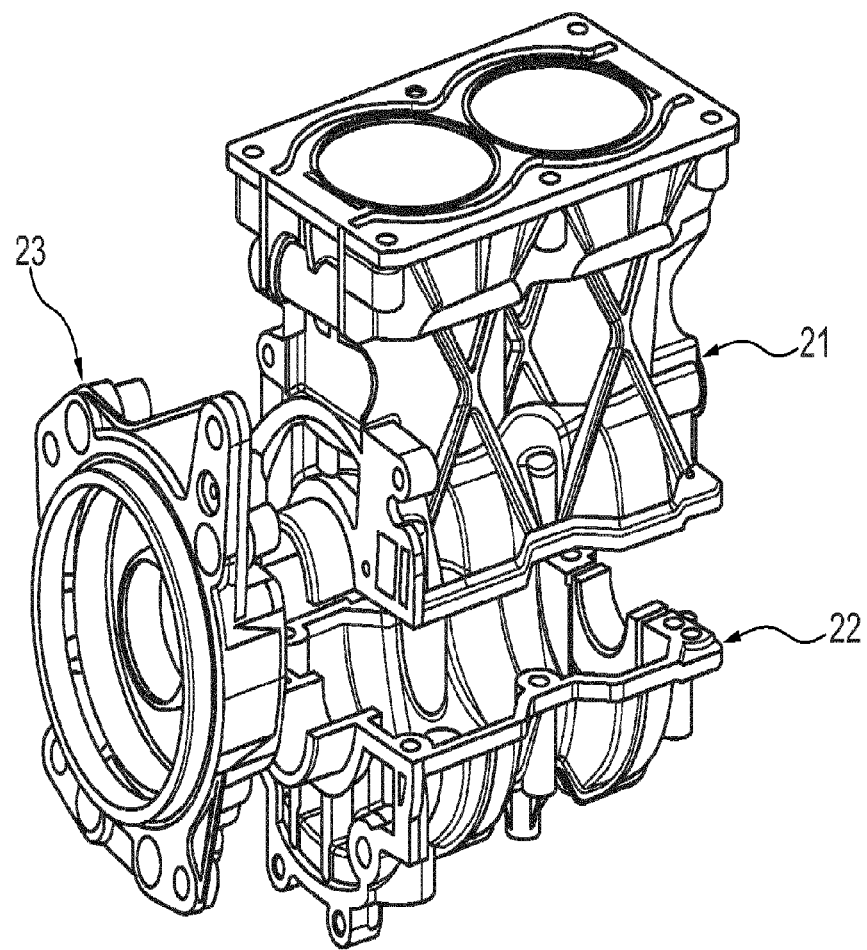
FIG. 2 shows a crankcase manufactured in two parts according to the prior art, with an additional flange for the connection to the drive source.

FIG. 2 shows a further compressor housing according to the prior art. The housing is also manufactured in two parts 21 and 22. For the connection to the drive source, an additional flange 23 is provided. By means of said flange, the sealing of the two housing parts 21 and 22 with respect to one another is decoupled from the sealing with respect to the connection to the drive source. In this way, the risk of leakage is reduced. Cumbersome assembly is disadvantageously still necessary, and the bolts and nuts required for this purpose are often difficult for a user to access owing to the constricted space conditions.

Figure 3:
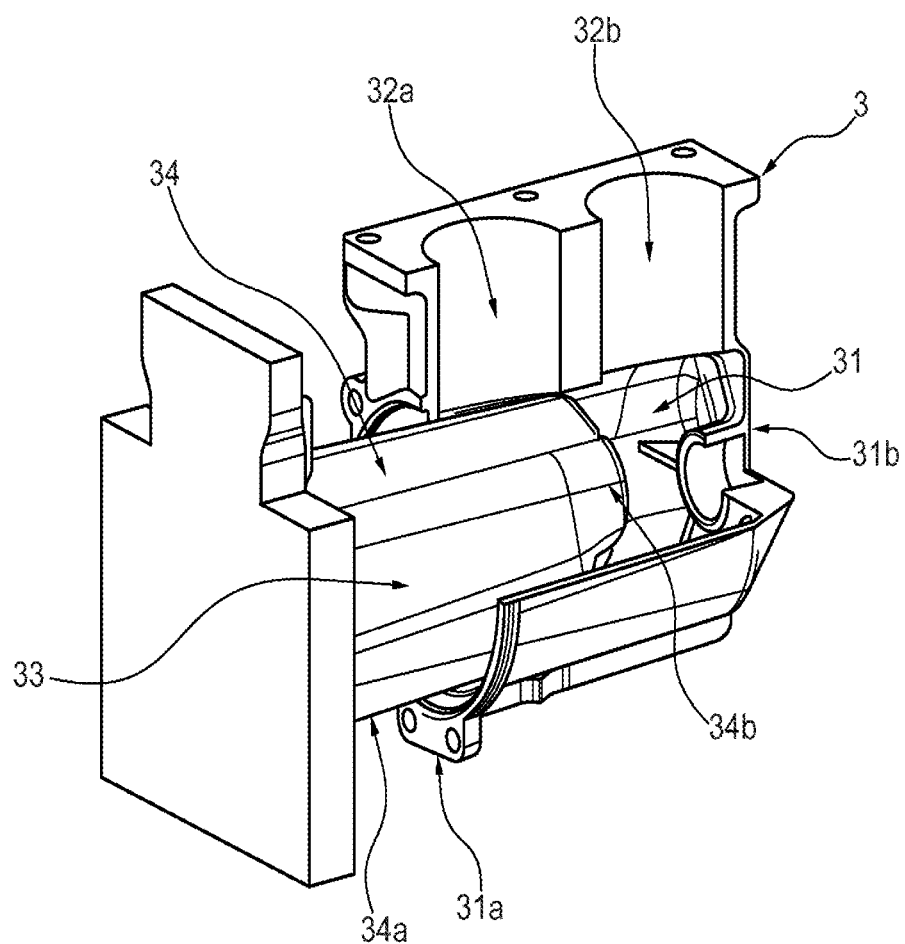
FIG. 3 shows the manufacture of a housing according to an embodiment of the invention.

FIG. 3 shows the manufacture of a housing 3 according to an embodiment of the invention. The housing has a crank chamber 31 and a first cylinder chamber 32a and a second cylinder chamber 32b. The crank chamber has two ends 31a and 31b. At its end 31a, the crank chamber has an opening 33 through which the crankshaft can be inserted into the crank chamber 31. In the state illustrated in FIG. 3, the shaping mandrel 34 with the ends 34a and 34b is situated in the opening and in a part of the crank chamber. The shaping mandrel narrows from its end 34a to its second end 34b. In the position illustrated in FIG. 3, the shaping mandrel has already been partially pulled out of the housing 3 after the cast material has cooled.

Figure 4:
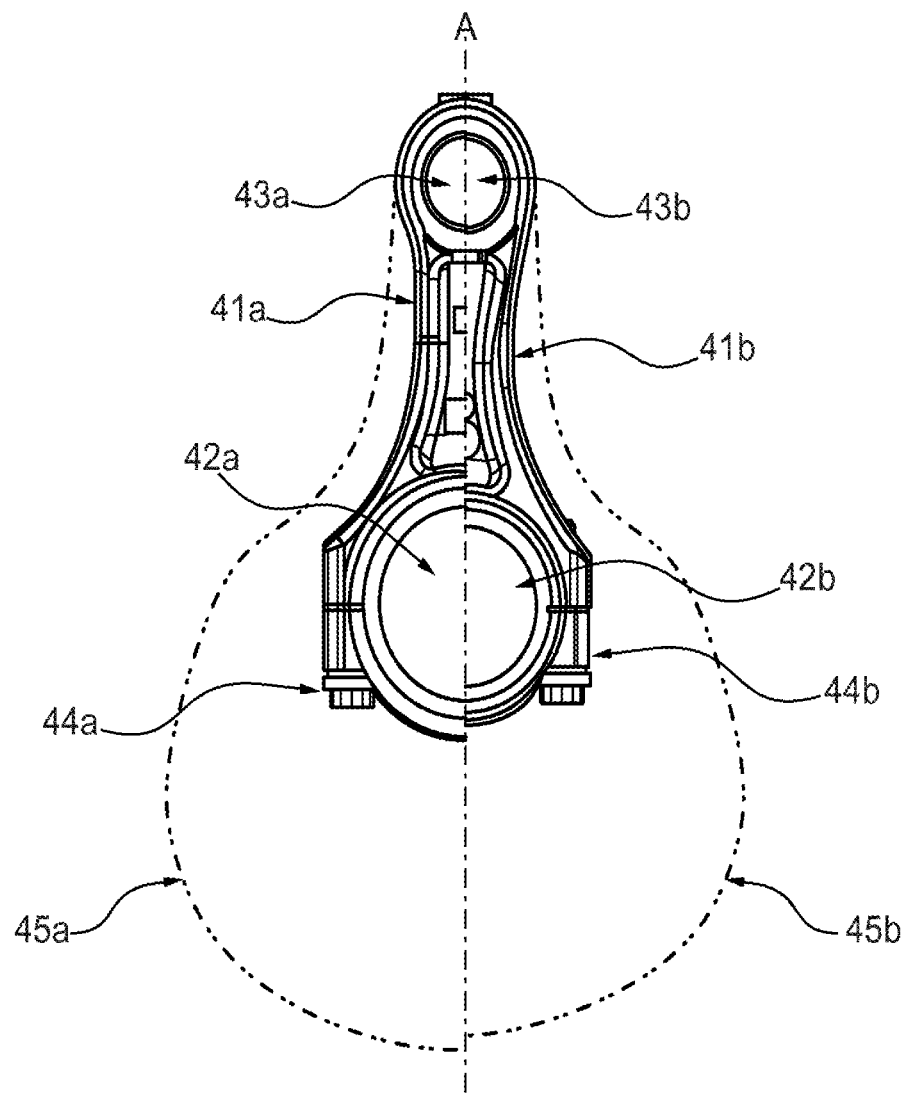
FIG. 4 shows a comparison of two connecting rods which, in one refinement of the invention, are used in a housing with two cylinders.

FIG. 4 shows the comparison of two connecting rods which are used in the exemplary embodiment of the compressor housing illustrated in FIG. 3. The first connecting rod 41a and the movement space 45a that it requires in the crank chamber are shown to the left of the line A. The second connecting rod 41b and the movement space 45b that it requires in the crank chamber are shown to the right of the line A. The second connecting rod 41b is used in the cylinder chamber 32b which is further removed from the opening 33 than the first cylinder chamber 32a. The first connecting rod 41a is used in the cylinder chamber 32a. Here, the available movement space is greater.

The first connecting rod 41a has a first connecting-rod eye 42a and a second connecting-rod eye 43a. By means of the first connecting-rod eye 42a, the first connecting rod is rotatably mounted on the crankshaft, specifically in an axis of rotation which is offset with respect to the axis of rotation of the crankshaft. Thus, the first connecting rod is caused to perform an upward and downward movement by a rotation of the crankshaft. The movement is converted into an upward and downward movement of the piston, by means of the second connecting-rod eye 43a, which is mounted so as to be rotatable relative to the piston. The region surrounded by the first connecting-rod eye 42a is denoted by the designation 44a. Its maximum radius of action during a movement around the crankshaft defines the movement space 45a that the first connecting rod requires in the crank chamber.

Analogously, the second connecting rod 41b has a first connecting-rod eye 42b by means of which said second connecting rod is mounted on the crankshaft. By means of its second connecting-rod eye 43b, the second connecting rod is mounted on the second piston. The connecting-rod eye 42b is surrounded by a region 44b, the maximum radius of action of which defines the total movement space 45b that the connecting rod requires within the crank chamber 31. The movement space 45b of the second connecting rod 41b is smaller than the movement space 45a of the connecting rod 41a. This allows for the fact that the inner diameter of the crank chamber 31 has narrowed at the location of the cylinder chamber 32b in relation to the location of the cylinder chamber 32a.

Figure 5:
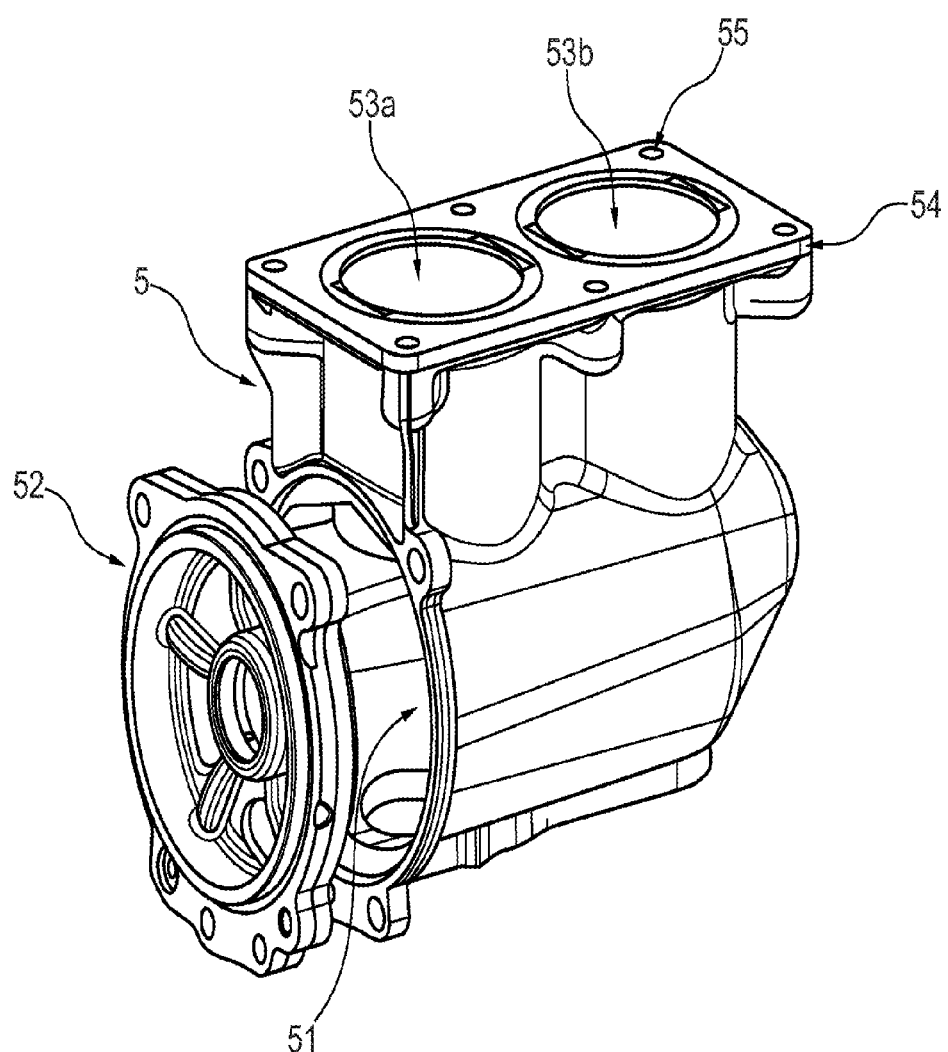
FIG. 5 shows an exterior view of a housing according to an embodiment of the invention with an additional flange for the connection to the drive or output.

FIG. 5 shows an external view of the finished housing 5. A flange 52 has been mounted onto the opening 51 into which the crankshaft can be inserted. If the housing 5 is used in a compressor, the drive is connected to the flange 52. By contrast, if the housing 5 is used in a motor, the output is connected to the flange 52. The cylinder chambers 53a and 53b are situated only partially within the housing 5. The cylinder chambers end at a base plate 54 with fastening devices 55. The cylinder head is subsequently mounted on the base plate 54. The pistons run not directly on the aluminum of the cylinder chambers 53a and 53b but on pressed-in cylinder barrels which can be exchanged when they have become worn.

The housing can be manufactured by high-pressure casting methods or else using other aluminum casting methods, such as for example sand casting or mold casting. The housing also need not be manufactured from aluminum, but may for example also be manufactured from cast iron.

LIST OF REFERENCE DESIGNATIONS 11, 12 Housing parts
21, 22 Housing parts
3 Housing
31 Crank chamber
31a, 31b Ends of the crank chamber 31
32a, 32b Cylinder chambers
33 Opening at the end 31a of the crank chamber 31
34 Shaping mandrel
34a, 34b Ends of the shaping mandrel 34
41a, 41b Connecting rods
42a, 42b First connecting-rod eye of the connecting rods 41a and 41b
43a, 43b Second connecting-rod eye of the connecting rods 41a and 41b
44a, 44b Region encompassing the first connecting-rod eye 42a and 42b
45a, 45b Movement spaces of the connecting rods 41a and 41b in the crank chamber 31
5 Housing
51 Opening of the housing 5
52 Flange
53a, 53b Cylinder chambers
54 Base plate
55 Fastening devices The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A housing for a motor or compressor, comprising:
   an elongate crank chamber, which has two end surfaces, for accommodating a crankshaft; and
   at least one cylinder chamber for accommodating a piston, wherein
   the crank chamber has, in a first end surface, an opening through which the crankshaft is insertable into said crank chamber,
   an inner diameter of the crank chamber narrows monotonously from the first end surface to the second end surface, the housing is cast in one piece, and the crank chamber tapers in the shape of a cone or frustum from the first end surface to the second end surface such that a shell of the cone or frustum is inclined with respect to its axis of symmetry by an angle of between 0.5 and 10 degrees.

2. The housing as claimed in claim 1, wherein the housing is composed at least partially of aluminum, magnesium, titanium or an aluminum, magnesium or titanium alloy.

3. A motor or compressor, comprising:

a crankshaft; and a housing for the motor or compressor, the housing including an elongate crank chamber that accommodates the crankshaft wherein an inner diameter of the crank chamber narrows monotonously from a first end surface to a second end surface;

wherein the housing has a first cylinder chamber with a first connecting rod and a second cylinder chamber with a second connecting rod, wherein the first and the second connecting rods are rotatably mounted on the crankshaft at a respective first end, and wherein the first and the second connecting rods are respectively rotatably mounted on a first piston in the first cylinder chamber and a second piston in the second cylinder chamber at a respective second end, wherein the first connecting rod has a larger outer and/or inner diameter than the second connecting rod, wherein the first connecting rod is disposed at a first area of the crank chamber with a first cross-sectional area, wherein the second connecting rod is disposed at a second area of the crank chamber with a second cross-sectional area, and wherein the first cross-sectional area is larger than the second cross-sectional area.

4. The motor or compressor as claimed in claim 3, wherein the first and the second pistons have identical diameters and/or identical stroke travels.

5. The motor or compressor as claimed in claim 3, wherein a flange is arranged on the first end surface of the crank chamber.

6. The motor or compressor as claimed in claim 5, wherein the crankshaft is led through the flange for connection to an output or drive.

7. The motor or compressor as claimed in claim 5, wherein the flange is designed to:

fasten the motor or compressor in an engine bay of a vehicle, and/or fasten a further assembly, which is driven by the crankshaft, to the motor or compressor.

8. A method for producing a housing, the method comprising the acts of:

manufacturing an elongated crank chamber having two end surfaces, the crank chamber being configured to accommodate a crankshaft, wherein the first end surface of a crank chamber has an opening to which the crankshaft is insertable and wherein an inner diameter of the crank chamber narrows monotonously from the first end surface to the second end surface;

wherein the manufacturing of the crank chamber is carried out by casting housing material around an elongate shaping madrel having two ends, an outer diameter of the elongate shaping mandrel narrowing monotonously from a first end to the second end.

9. The method as claimed in claim 8, further comprising the act of:

pulling the shaping mandrel at its first end out of the housing after the casting act is carried out.

* * * * *